United States Patent
Yang et al.

(10) Patent No.: US 11,428,842 B2
(45) Date of Patent: Aug. 30, 2022

(54) SPEED OF TOOL ASSESSMENT VIA SPEED KERNELS

(71) Applicant: Halliburton Energy Services, Inc., Houston, TX (US)

(72) Inventors: Jie Yang, Houston, TX (US); Rebecca Jachmann, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 16/638,513

(22) PCT Filed: Apr. 12, 2019

(86) PCT No.: PCT/US2019/027334
§ 371 (c)(1),
(2) Date: Feb. 12, 2020

(87) PCT Pub. No.: WO2020/209874
PCT Pub. Date: Oct. 15, 2020

(65) Prior Publication Data
US 2021/0270990 A1    Sep. 2, 2021

(51) Int. Cl.
*G01V 3/32* (2006.01)
*E21B 49/00* (2006.01)
*G01V 3/38* (2006.01)

(52) U.S. Cl.
CPC ............ *G01V 3/32* (2013.01); *E21B 49/00* (2013.01); *G01V 3/38* (2013.01)

(58) Field of Classification Search
None
See application file for complete search history.

(56) References Cited

U.S. PATENT DOCUMENTS

| | | | |
|---|---|---|---|
| 6,518,756 B1 | 2/2003 | Morys et al. | |
| 6,566,874 B1 | 5/2003 | Speier et al. | |
| 10,539,705 B2* | 1/2020 | Coman | G01V 3/40 |
| 10,739,489 B2* | 8/2020 | Coman | G01V 3/32 |
| 2006/0033491 A1* | 2/2006 | Blanz | G01V 3/32 |
| | | | 324/303 |
| 2007/0222443 A1 | 9/2007 | Blanz | |

(Continued)

OTHER PUBLICATIONS

PCT Application Serial No. PCT/US2019/027334, International Search Report, dated Jan. 10, 2020, 3 pages.

(Continued)

*Primary Examiner* — Douglas X Rodriguez
(74) *Attorney, Agent, or Firm* — Delizio, Peacock, Lewin & Guerra

(57) ABSTRACT

Echo signals are acquired from operation of a nuclear magnetic resonance logging (NMR) tool in a borehole. The acquired echo signals are processed with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP. Each spectrum is processed with respect to the respective matrices in the plurality of matrices to produce a test echo signal for each ROP. The acquired echo signals and the test echo signal for each ROP are processed to produce an error for each ROP. The ROP for the minimum of the errors is identified as the ROP of the NMR tool.

20 Claims, 7 Drawing Sheets

(56) References Cited

U.S. PATENT DOCUMENTS

| | | |
|---|---|---|
| 2015/0241541 A1 | 8/2015 | Blanz et al. |
| 2016/0018555 A1 | 1/2016 | Jachmann et al. |
| 2016/0116629 A1 | 4/2016 | Coman et al. |
| 2017/0205527 A1 | 7/2017 | Coman et al. |

OTHER PUBLICATIONS

PCT Application Serial No. PCT/US2019/027334, International Written Opinion, dated Jan. 10, 2020, 4 pages.

\* cited by examiner

SPEED OF TOOL ASSESSMENT VIA SPEED KERNELS

BACKGROUND

Nuclear magnetic resonance (NMR) is used as a tool in many different technology areas to investigate different types of mediums. NMR can occur when the medium, containing nuclear spins with quantum number not equal to 0, is subjected to a static magnetic field, $B_0$, and to an oscillating magnetic field, $B_1$. When subjected to an applied static magnetic field, polarization of nuclear magnetic spins of the medium occurs based on nucleus of the medium and magnetic field strength. Applying an electromagnetic field to the medium in the static magnetic field can perturb the polarization established by the static magnetic field. In optimal measurements, the static magnetic field and the oscillating magnetic field are perpendicular to each other. Collected responses received from the medium related to the total magnetization of nuclear spins in the medium, in response to these applied fields, can be used to investigate properties of the medium, and may provide imaging of the medium. Magnetization is proportional to polarization.

Nuclear magnetic resonance measures the precession of excited nuclear magnetic spins in the transverse plane, that is, the direction perpendicular to the magnetic field. This precession eventually dies out and the equilibrium magnetization returns. The return process is referred to as longitudinal relaxation. The time constant, $T_1$, for nuclei to return to their equilibrium magnetization, $M_o$, is called the longitudinal relaxation time or the spin lattice relaxation time. The magnetization dephasing, that is the loss of coherence, along the transverse plane is given by the time constant $T_2$ and is called the spin-spin relaxation time. The loss of phase coherence can be caused by several factors including interactions between spins, electrons, or magnetic gradients.

A widely used NMR measurement technique, designed by Carr, Purcell, Meiboom, and Gill and, hence, referred to as CPMG, uses a sequence of radio frequency pulses to produce spin echoes and counteract dephasing of the magnetization in a gradient field. In the CPMG sequence, an initial "excitation" pulse, commonly a 90° pulse, can be applied to tip the polarization into a plane perpendicular to the static magnetic field. To counter dephasing due to magnetic inhomogeneities, another pulse, a "recovery" pulse, commonly a 180° or other angle tipping pulse, is applied to return to coherent phase, which produces a signal called an echo from the medium. After each return to coherent phase, dephasing begins and another recovery pulse is applied for rephasing. Rephasing or refocusing is repeated many times in the CPMG sequence, followed by measuring each echo.

The echo magnitude decreases with time due to a number of irreversible relaxation mechanisms. The CPMG sequence can have any number of echoes, where the time between each echo can be relatively short, for example, of the order of 0.5 milliseconds (ms) or less. TE is the time between 2 adjacent echoes. Within an echo train the TE may be changed between pulses.

The CPMG is used to measure the $T_2$ relaxation rate. The broader use of pulses which cause spin echoes is known as an echo train. A sequence of different echo trains sometimes is used as one set of data when an additional time domain is needed. One such grouping of echo trains is made when multiple echo trains are acquired with different TEs.

To measure $T_1$ a second time domain for recovery is needed. The magnetization is perturbed from its equilibrium state. It can be inverted, i.e., tipped 180° from along the magnetic field to against it, it can be tipped into the transverse plane, i.e., tipped 90° from along the magnetic field, or it can be scrambled. The magnetization is then allowed to build up for a wait time, WT. The wait time is the indirect time domain that is used to observe $T_1$. The inversion or saturation pulse can be followed by an excitation pulse after the wait time, then followed by an echo train. Several wait times are needed to get an accurate $T_1$ measurement NMR logging tools have long proven their value to formation evaluation. Petrophysical information can be derived from NMR measurements, such as, but not limited to petrophysical properties of fluid-containing porous media. Various properties that can be inferred using an NMR logging tool including pore size, porosity, surface-to-volume ratio, formation permeability, and capillary pressure. These properties are determined from inversion of data and further analysis. Recently, new drilling tools have added low-gradient magnet configurations to help reduce the effects of lateral motion. The challenge is that the sensitive volume associated with low-gradient tools provides a vertically short sensitive volume. As a result, the tools are more sensitive to vertical motion, and thus to rate of penetration (ROP) or pulling speed, opposed to high-gradient configuration tools, particularly for $T_1$ logging. Not only is porosity affected, but the $T_1$ spectrum can also be distorted. Having a more reliable inversion may provide more precision in the evaluation of NMR data to generate correct porosity, $T_2$ spectra, $T_1$ spectra, diffusion spectra, and other parameters.

United States Patent Application Publication No. 2016/0018555, filed on Aug. 24, 2015, entitled "Data Processing With Magnetic Resonance Tool," describes a technique for processing NMR data to compensate for motion of the NMR logging tool. Knowledge of the speed of the NMR logging tool is needed in this technique. Determining the axial speed of movement of the NMR logging tool may be a challenge, such as when the NMR tool is part of a drill string or a string of logging tools and the data rate between the NMR tool and analysis tools on the surface is limited.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
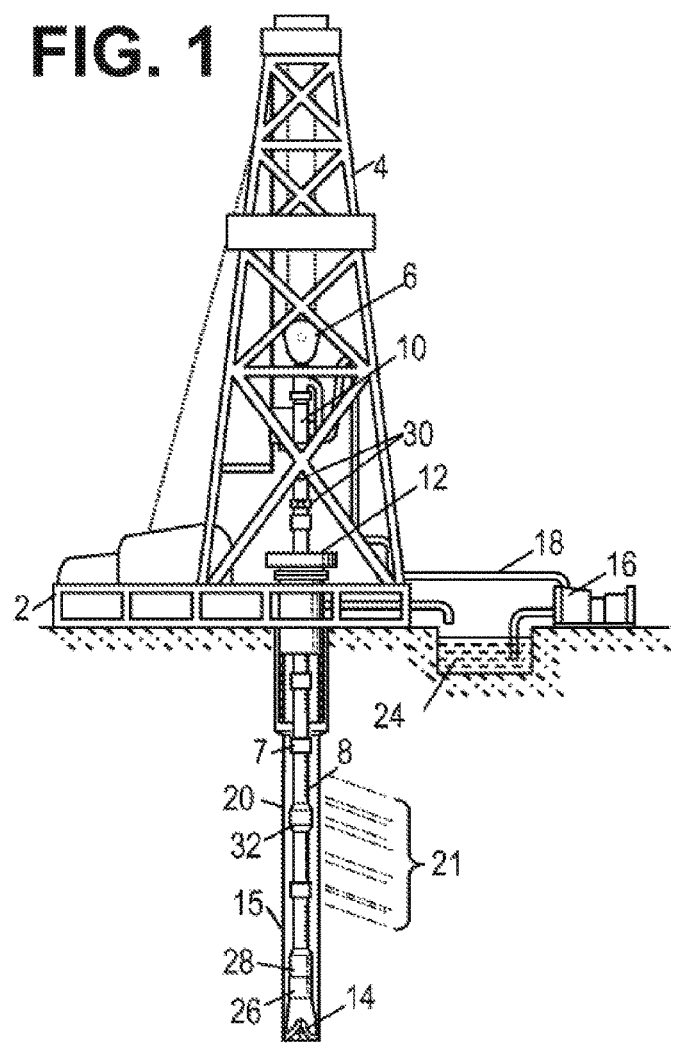
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A top drive 10 supports and rotates the drill string 8 as the string is lowered through a well head 12. The drill string's rotation (and/or a downhole motor) drives a drill bit 14 to extend the borehole 15 through subsurface earth formations 21. Mud recirculation equipment 16 draws drilling fluid from a retention pit 24 and pumps it through a feed pipe 18 to top drive 10, through the interior of drill string 8 to the drill bit 14, through orifices in the drill bit, through the annulus around drill string 8 to a blowout preventer at the surface, and through a discharge pipe into the pit 24. The drilling fluid transports cuttings from the borehole into the pit 24 and aids in maintaining the borehole integrity.

A nuclear magnetic resonance (NMR) logging tool 26 is integrated into the bottom-hole assembly near the bit 14. The NMR logging tool 26 may take the form of a drill collar, i.e., a thick-walled tubular that provides weight and rigidity to aid the drilling process. As the bit extends the borehole through the formations, the NMR logging tool collects measurements relating to spin relaxation time ($T_1$, $T_2$, and/or $T_2^*$) distributions as a function of depth or position in the borehole. Other tools and sensors can also be included in the bottomhole assembly to gather measurements of various drilling parameters such as position, orientation, weight-on-bit, borehole diameter, etc. Control/telemetry module 28 collects data from the various bottomhole assembly instruments (including position and orientation information) and stores them in internal memory, which may be able to store hundreds of hours of data. Selected portions of the data (raw or processed) can be communicated to surface receivers 30 by, e.g., mud pulse telemetry. Other logging-while drilling telemetry methods also exist and could be employed. For example, electromagnetic telemetry or through-wall acoustic telemetry can be employed with an optional repeater 32 to extend the telemetry range. Most telemetry systems also enable commands to be communicated from the surface to the control and telemetry module to configure the operation of the tools.

Figure 2:
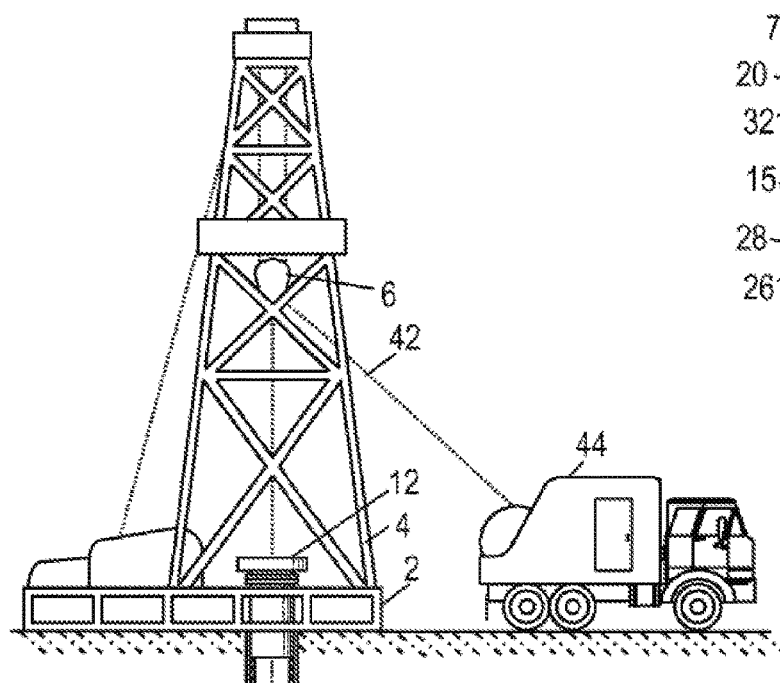
FIG. 2 shows an illustrative logging environment.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads 36 and/or centralizing springs or a decentralizer to maintain the tool in the right position, for example, that could be near the axis of the borehole or against wall, as the tool is pulled uphole. As explained further below, tool 34 can include an NMR logging instrument that collects relaxation time distribution measurements. A logging facility 44 collects measurements from the logging tool 34 and includes a computer system for processing and storing the measurements gathered by the logging tool.

Figure 3:
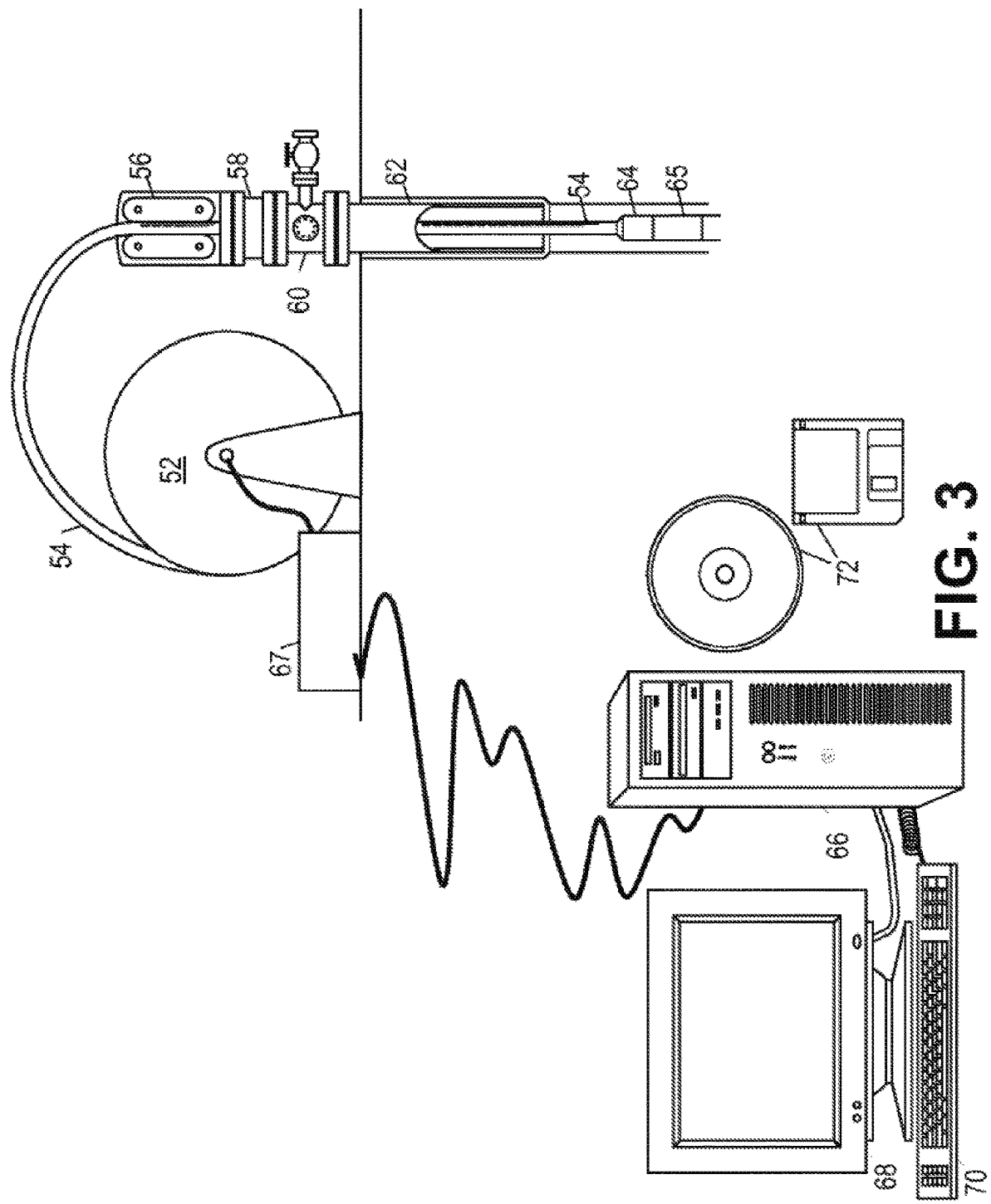
FIG. 3 shows an illustrative coil tubing logging system.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data, to be conveyed to the surface computer system 66.

Surface computer system 66 is configured to communicate with supervisory sub 64 to set logging parameters and collect logging information from the one or more logging tools 65 such as an NMR logging tool. Surface computer system 66 is preferably configured by software (shown in FIG. 3 in the form of removable storage media 72) to monitor and control downhole instruments 64, 65. System 66 includes a display device 68 and a user-input device 70 to enable a human operator to interact with the system control software 72.

In each of the foregoing logging environments, the logging tool assemblies preferably include a navigational sensor package that includes direction sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) or angle from the high side of the wellbore. In accordance with known techniques, wellbore directional measurements can be made as follows: a three-axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottom hole assembly can be determined. Additionally, a three-axis magnetometer measures the earth's magnetic field vector in a similar manner. Or gyro sensors can be used to measure angular velocity. From the combined gyro, magnetometer and accelerometer data, the horizontal angle of the bottom hole assembly may be determined. A motion sensing unit can also be included to track the position of the tool. In many cases, the motion sensing unit can derive the position information from the direction sensors.

Figure 4:
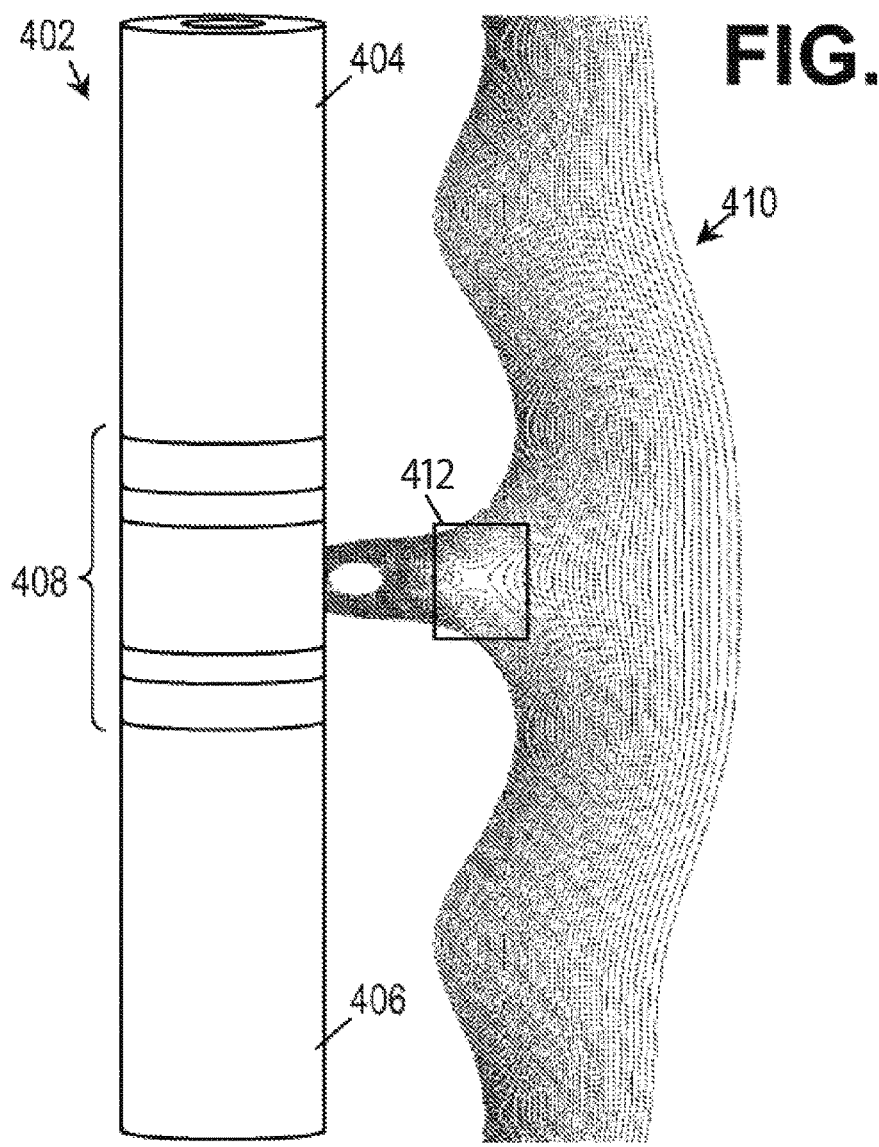
FIG. 4 shows a side view of an illustrative NMR logging tool.

FIG. 4 shows a side view of an illustrative NMR logging tool 402, without its external shell. Tool 402 includes an arrangement of permanent magnets to provide an azimuthally-symmetric static field $B_0$ (shown in cross-section by contour lines 410). Two of the permanent magnets 404, 406 can be seen in FIG. 4. (The rest of the magnets 502 can be seen in one of the exploded views of FIG. 5). The magnets may be arranged with like poles together, i.e., north to north and south to south. Such an arrangement creates a relatively large sensing volume. That portion of the static field having an appropriate strength for NMR measurements can be found within zone 412, but of course the measurements also require the use of a radio frequency field ($B_\perp$) perpendicular to the static field. To conduct the NMR measurements, the tool can employ coaxial, solenoidal, frame, or any other kind of antenna in any number in region 408 to induce in zone 412 magnetic field lines that are primarily perpendicular to the static magnetic field. Permeable materials may be employed to enhance sensitivity of the antennas as well as for favorably shaping field lines. Such permeable materials would typically be positioned directly underneath the antenna.

Figure 5:
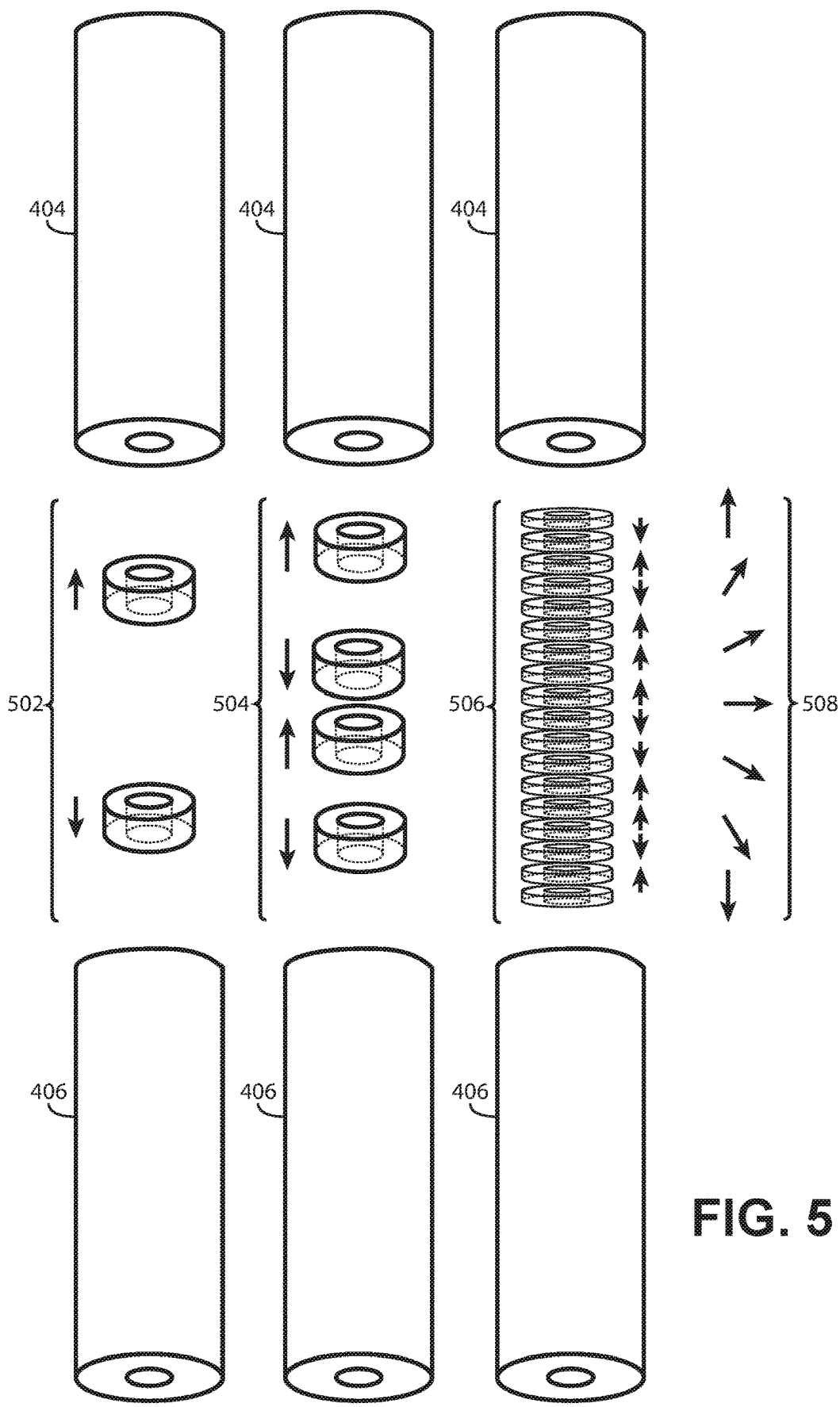
FIG. 5 shows exploded views of illustrative magnet arrangements for azimuthally symmetric NMR tool designs.

FIG. 5 shows exploded views of illustrative magnet arrangements for azimuthally symmetric NMR tool designs. An even number of axially-magnetized magnets 502, 504, or 506 can be positioned with like-poles adjacent to each other to create and shape a suitable sensing region in the formation around the borehole. The exact sizes and strengths of the magnets are parameters that can be optimized for the particular tool application. The magnets are not limited to having axial magnetizations. For example, the magnetizations may progress as indicated by arrows 508 from purely axial to purely radial and back to purely axial, with the magnetic fields created by the individual magnets still being substantially azimuthally symmetric.

Figure 6:
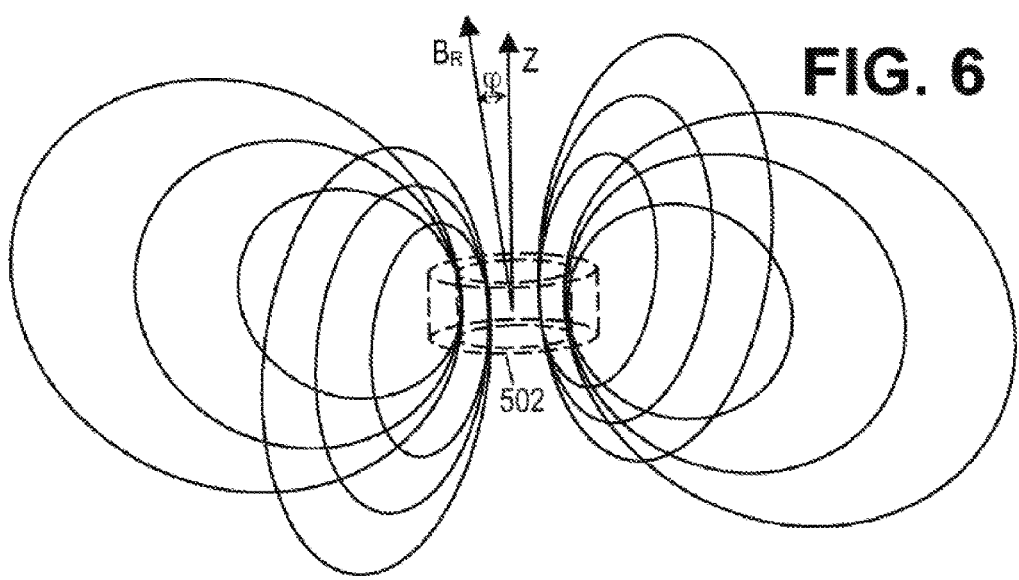
FIG. 6 shows a relationship between a magnetization axis of a magnet and a tool axis.

Because it employs an azimuthally symmetric sensing region, the illustrated NMR tool design is not only suitable for use in wireline or tubing-conveyed logging environment, but also in a LWD environment where the tool rotates with the drill string. The azimuthal symmetry prevents the tool's rotation from introducing any discrepancy between the volume excited by RF pulses and the volume in which subsequent signal measurements occur. Unfortunately, the field may lack true azimuthal symmetry due to limitations in the manufacturing process for the permanent magnets. As indicated in FIG. 6, the magnetization axis of magnet 602 may not be fully aligned with the tool axis, and due to imperfections in the magnet there may be other deviations of the magnet's field from that of an ideal magnet. Other designs might be created that are nearly azimuthally symmetric, but are not truly azimuthally symmetric. Even fields that are completely not symmetric could be used for the method, but are not preferred in drilling circumstances.

Figure 7A:
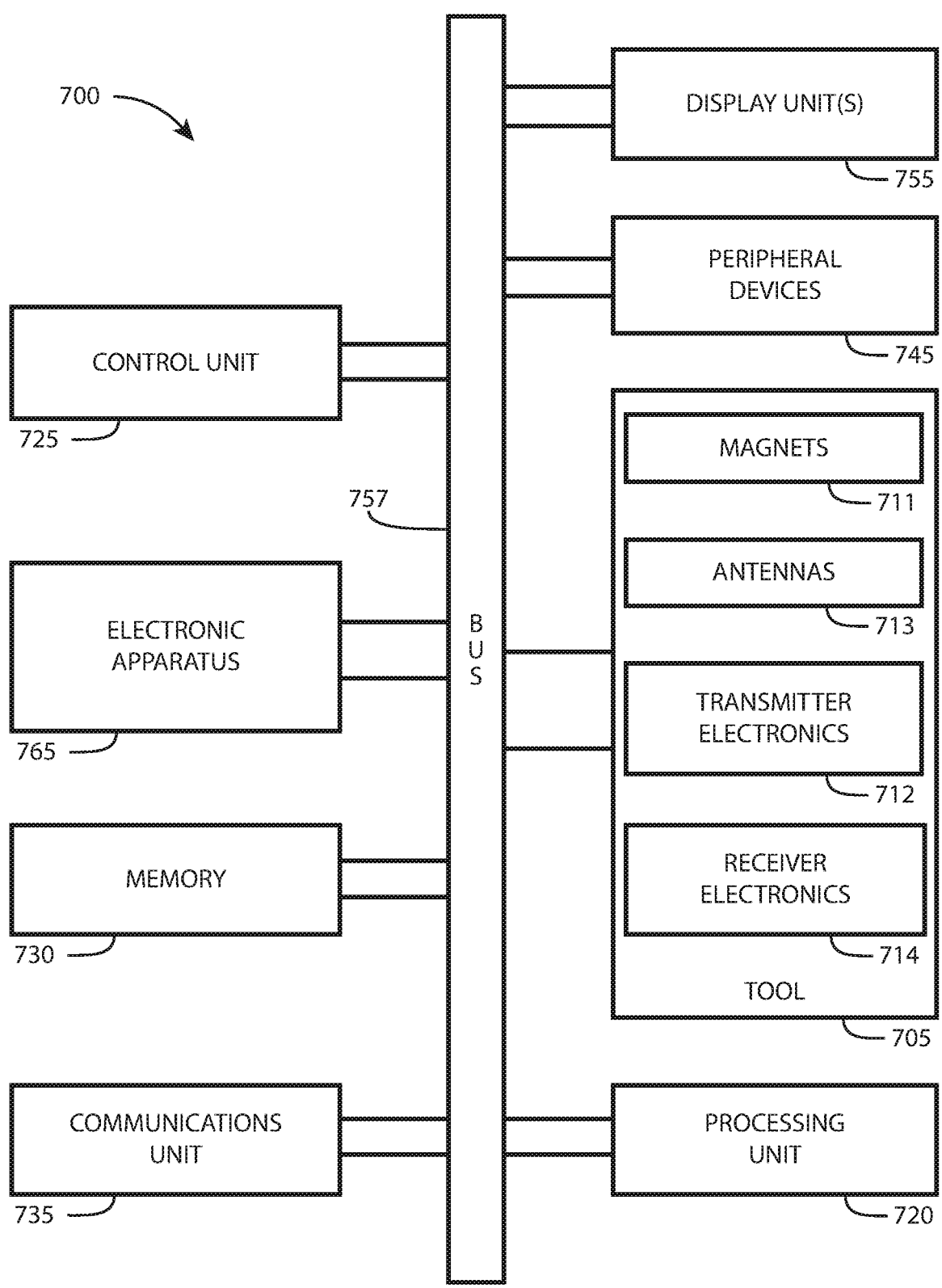
FIG. 7A is a block diagram of features of an example embodiment of a system 700 operable to process nuclear magnetic resonance data taking into account motion of a NMR logging tool.

FIG. 7A is a block diagram of features of an example embodiment of a system 700 operable to process nuclear magnetic resonance data taking into account motion of an NMR logging tool 705, as described herein or in a similar manner. The system 700 can include the NMR tool 705 having an arrangement of magnets 711, antenna(s) 713, transmitter electronics 712, and receiver electronics 714. The system 700 can be configured to operate in accordance with the teachings herein.

The system 700 can include a control unit 725, a memory 730, an electronic apparatus 765, and a communications unit 735. The memory 730 can be structured to include a database. The control unit 725, the memory 730, and the communications unit 735 can be arranged to operate as a processing unit to control operation of the transmitter electronics 712 and the receiver electronics 714 and to perform operations on the signals collected by the receiver electronics 714 to process nuclear magnetic resonance data taking into account motion of the NMR logging tool 705. A processing unit 720, structured to process nuclear magnetic resonance data taking into account motion of the NMR logging tool 705, can be implemented as a single unit or distributed among the components of the system 700 including electronic apparatus 765. The control unit 725 and the memory 730 can operate to control activation of the transmitter electronics 712 to generate echo train sequences and recovery pulses. The control unit 725 and the memory 730 can operate to control selection of the receiver electronics 714 in the tool 705 and to manage processing schemes. The control unit 725, the memory 730, and other components of the system 700 can be structured, for example, to operate similar to or identical to the components discussed herein or similar to or identical to any of methods discussed herein.

The system 700 can also include a bus 757, where the bus 757 provides electrical conductivity among the components of the system 700. The bus 757 can include an address bus, a data bus, and a control bus, each independently configured or in an integrated format. The bus 757 can be realized using a number of different communication mediums that allows for the distribution of components of the system 700. Use of the bus 757 can be regulated by the control unit 725. Bus 757 can include a communications network.

In various embodiments, the peripheral devices 745 can include additional storage memory and other control devices that may operate in conjunction with the control unit 725 and the memory 730. In an embodiment, the control unit 725 can be realized as a processor or a group of processors that may operate independently depending on an assigned function. The system 700 can include display unit(s) 755, which can be used with instructions stored in the memory 730 to implement a user interface to monitor the operation of the tool 705 or components distributed within the system 700.

The components shown in FIG. 7A need not be distributed as shown. Some of the components may be located on the surface, some in the tool 705, some in other locations in the drill string 8, wireline logging tool 34, logging tools 65, or some other location in the systems illustrated in FIGS. 1, 2, and 3, and some may be distributed among those locations.

Figure 7B:
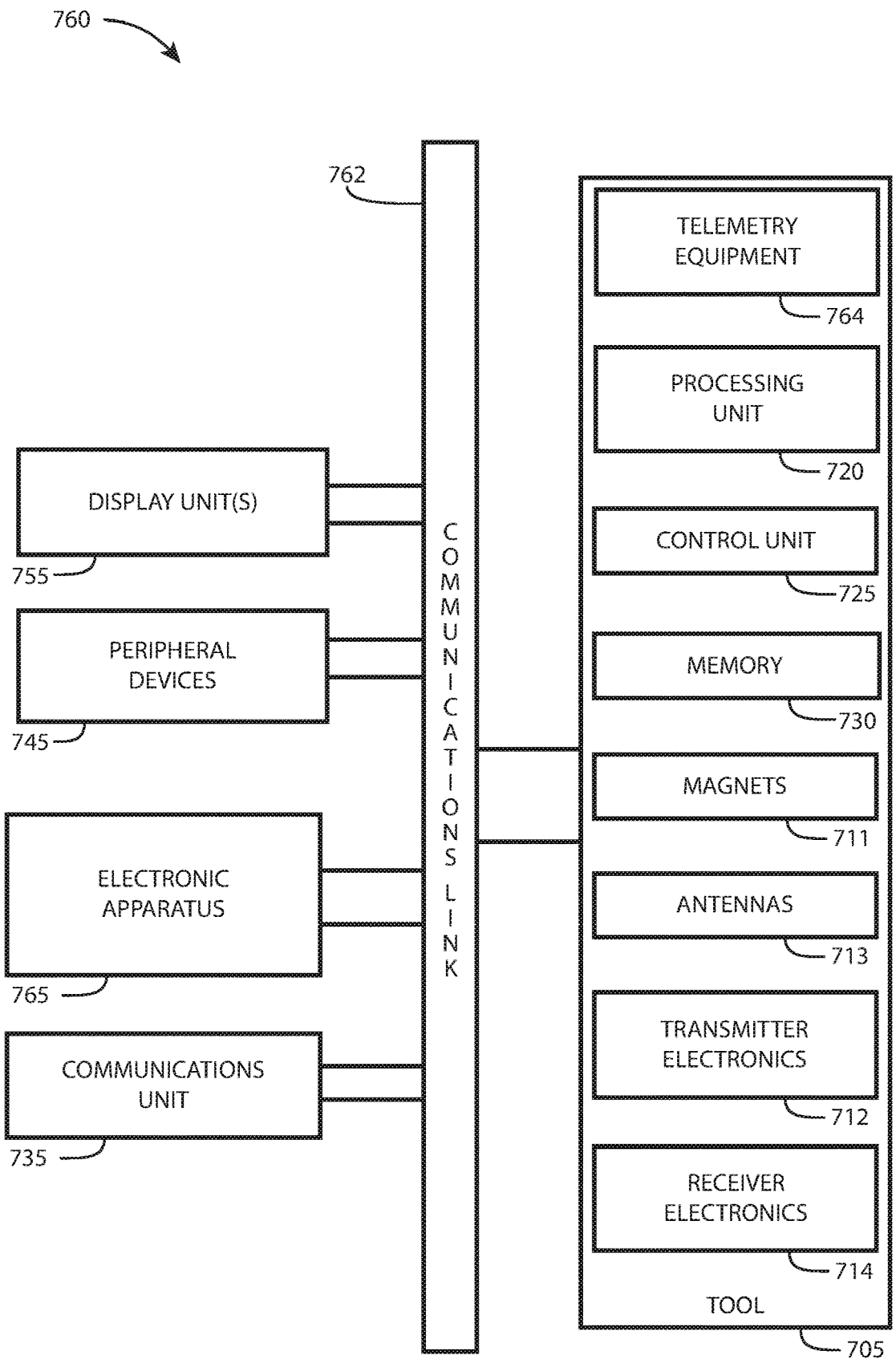
FIG. 7B is a block diagram of features of an example embodiment of a system 700 operable to process nuclear magnetic resonance data taking into account motion of a NMR logging tool.

FIG. 7B is block diagram of features of another example embodiment of a system operable to process nuclear magnetic resonance data taking into account motion of an NMR logging tool, as described herein or in a similar manner. In the system 760 illustrated in FIG. 7B, the processing unit 720, the control unit 725, and the memory 730 are located in the tool 705. The components in the tool 705 communicate via a communications link 762 using telemetry equipment 764 to communicate with, for example, the communications unit 735.

The NMR tool acquires echoes based on the pulse sequence used, here this data is designated as s(t). To interpret the data, s(t) is inverted into different basis: $T_2$ (i.e., transverse relaxation), $T_1$ (i.e., longitudinal recover time), or D (i.e., diffusion). To perform this inversion, the data is fit to known answers.

$$s(t) = \sum_{ij} x_{ij} \cdot A(T_{1i}, T_{2j}) \qquad (1)$$

When the tool is stationary, the signal, omitting surface/volume interaction, is known to include a series of echoes for each wait time, where the jth echo for the kth wait time has the form:

$$y^{k,m}(n) = \sum_{h=1}^{r} \sum_{j=1}^{q} \sum_{i=1}^{p} x_{ij} \cdot \left(1 - e^{-\frac{TW_k}{T_{1i}}}\right) \cdot e^{-\frac{\tau_n}{T_{2j}}} \cdot e^{-\frac{D_h(\gamma \cdot G_b \cdot TE_m)^2 \cdot \tau_n}{12}} \qquad (2)$$

where:

$y^{k,m}(n)$ is the nth echo for the kth wait time for the mth TE, q is the total number of $T_2$ components, p is the total number of $T_1$ components, r is the number of diffusion constants, n is the count of the echo, m is the number of TEs, $x_{11} \ldots x_{pq}$ are the amplitudes of the respective spectrum components, $TW_k$ is the kth wait time, $T_{21} \ldots T_{2q}$ are the $T_2$ time constants for each of the q factors, $T_{11} \ldots T_{1p}$ are the $T_1$ time constants for each of the p factors, $TE_m$ is the inter-echo time, $\tau_n$ is the time when the nth echo is acquired, $D_h$ is the hth diffusion constant, $\gamma$ is the gyromagnetic ratio, and $G_b$ is the average gradient for a single band b.

While equation (2) includes little assumptions, in practice equation (2) is simplified. The exact simplification used will vary based on the parameter targeted to pick up ROP. Parameters that are ROP sensitive are $T_1$, $T_2$, and diffusion. The embodiment described below will focus on $T_1$, but it is in no way limited to $T_1$. Common simplifications for $T_1$ use a ratio between $T_1$ and $T_2$, only a single TE, assume a single Gradient (G), assume a constant diffusion (D) and have the form:

$$y^k(n) = \sum_{i=1}^{p} x_i \cdot \left(1 - e^{-\frac{TW_k}{T_{1i}}}\right) \cdot e^{-\frac{n \cdot TE}{T_{2i}}} \cdot e^{-\frac{D(\gamma \cdot G \cdot TE)^2 \cdot n \cdot TE}{12}} \quad (3)$$

where:

$y^k(j)$ is the jth echo for the kth wait time, p is the total number of $T_1$ components, $x_1 \ldots x_p$ are the amplitudes of the respective spectrum components, $TW_k$ is the kth wait time, $T_{11} \ldots T_{1p}$ are the $T_1$ time constants for each of the p factors, $T_{21} \ldots T_{2p}$ are the $T_2$ time constants for each of the p factors (note that to eliminate the j dimension of the x matrix in equation (1) and thereby simplify equation (2), $T_{2j}$ is assumed to be proportional to $T_{1i}$ so that $T_{2j} \alpha T_{1i}$ for all i and j for a particular wait time $TW_k$ and $T_{2j}$ is renamed $T_{2i}$), TE is the inter-echo time (note that, to simplify equation (2), only one inter-echo time is assumed), D is the diffusion constant, $\gamma$ is the gyromagnetic ratio, and G is the gradient.

Equation (3) can be written in matrix form as below:

$$\begin{matrix} TW_1 \begin{bmatrix} y^1(1) \\ y^1(2) \\ \ldots \\ y^1(n_1) \end{bmatrix} \\ TW_2 \begin{bmatrix} y^2(1) \\ y^2(2) \\ \ldots \\ y^2(n_2) \end{bmatrix} \\ \ldots \\ TW_m \begin{bmatrix} y^m(1) \\ y^m(2) \\ \ldots \\ y^m(n_m) \end{bmatrix} \end{matrix} = \begin{bmatrix} A^1_{11} & A^1_{21} & \ldots & A^1_{p1} \\ A^1_{12} & A^1_{22} & \ldots & A^1_{p2} \\ \ldots & \ldots & \ldots & \ldots \\ A^1_{1n_1} & A^1_{2n_1} & \ldots & A^1_{pn_1} \\ A^2_{11} & A^2_{21} & \ldots & A^2_{p1} \\ A^2_{12} & A^2_{22} & \ldots & A^2_{p2} \\ \ldots & \ldots & \ldots & \ldots \\ A^2_{1n_2} & A^2_{2n_2} & \ldots & A^2_{pn_2} \\ \ldots & \ldots & \ldots & \ldots \\ A^m_{11} & A^m_{21} & \ldots & A^m_{p1} \\ A^m_{12} & A^m_{22} & \ldots & A^m_{p2} \\ \ldots & \ldots & \ldots & \ldots \\ A^m_{1n_m} & A^m_{2n_m} & \ldots & A^m_{pn_m} \end{bmatrix} \begin{bmatrix} x_1 \\ x_2 \\ \ldots \\ x_p \end{bmatrix} \quad (4)$$

where (ignoring the term with the diffusion constant because D is not known):

$$A^k_{ij} = A^{WT\ number}_{T2\ bin,\ echo\ number} = \left(1 - e^{-\frac{TW_k}{T_{1i}}}\right) \cdot e^{-\frac{j \cdot TE}{T_{2i}}} \quad (5)$$

The above equation (4) can be shortened as:

$$Y = AX \quad (6\text{-}1)$$

where:

$$Y = \begin{bmatrix} y^1(1) \\ y^1(2) \\ \ldots \\ y^1(n_1) \\ y^2(1) \\ y^2(2) \\ \ldots \\ y^2(n_2) \\ \ldots \\ y^m(1) \\ y^m(2) \\ \ldots \\ y^m(n_m) \end{bmatrix}, \quad (6\text{-}1a)$$

$$A = \begin{bmatrix} \vec{A^k_1} & \vec{A^k_2} & \ldots & \vec{A^k_p} \end{bmatrix}, \quad (6\text{-}1b)$$

$$X = \begin{bmatrix} x_1 \\ x_2 \\ x_3 \\ \ldots \\ x_p \end{bmatrix}, \text{ and} \quad (6\text{-}1c)$$

-continued $$\text{Vector } A_i^k = \begin{bmatrix} A_{i1}^1 \\ A_{i2}^1 \\ \ldots \\ A_{in_1}^1 \\ A_{i1}^2 \\ A_{i2}^2 \\ \ldots \\ A_{in_2}^2 \\ \ldots \\ A_{i1}^m \\ A_{i2}^m \\ \ldots \\ A_{in_m}^1 \end{bmatrix} \text{ is the column vector} \quad (6\text{-}1d)$$

Vector $A_i^k$ can be re-written as:

$$\text{Vector } A_i^k = \begin{bmatrix} \text{Vector } B_i^1 \\ \text{Vector } B_i^2 \\ \ldots \\ \text{Vector } B_i^m \end{bmatrix} \quad (6\text{-}1e)$$

where:

$$\text{Vector } B_i^k = \begin{bmatrix} A_{i1}^k \\ A_{i2}^k \\ \ldots \\ A_{in_m}^k \end{bmatrix}. \quad (6\text{-}1f)$$

Vector $B_i^k$ is an echo train with recovery time $TW_k$, a $T_1$ time constant=$T_{1i}$, a $T_2$ time constant=$T_{2i}$, and $n_k$ echoes, and Vector $A_i^k$ is the combined echo trains with all recovery times $TW_1$, $TW_2$, . . . and $TW_m$, but the same $T_1$ time constant and $T_2$ time constant for each recovery time. Vector $A_i^k$ is called a single $T_1$ component echo vector.

The spectrum vector X is given by:

$$X = A^{-1}Y \quad (6\text{-}2)$$

When the NMR tool is moving at a speed v, a single component echo vector Vector $A_j^k$ varies with speed and is denoted Vector $A_j^k(v)$. The corresponding Y is Y(v). X remains the same because X is an intrinsic property of the formation. There are many factors in the echo train that can change while in motion. There is the polarization of the $T_1$, captured in a $T_1$ sequence. There is the decay of the echo train captured by a CPMG, or CPMG derived sequence. There is the inflicted phases that is similar to a diffusion measurement, captured by doing a diffusion editing like sequence.

When the tool is in motion, equation (6-1) can be re-written as:

$$Y(v) = A(v)X \quad (7\text{-}1)$$

and the solution as:

$$X = A(v)^{-1}Y(v) \quad (7\text{-}2)$$

If the inverse of the stationary matrix A is used in equation (7-2), the result is:

$$X^* = A^{-1}Y(v) = A^{-1}A(v)X \quad (7\text{-}3)$$

Since A(v) is different from the stationary A due to $B_0$ inhomogeneity, $A^{-1}A(v)$ is not equal to the unit matrix I, which means that X* is not the same as X. In other words, if the stationary matrix A is used with data collected with the NMR tool is moving, an error is created. This is called motion effect.

Consider corrections to X*. The term X* can be corrected by the following equation:

$$X = A(v)^{-1}AX^* \quad (8)$$

where $A(v)^{-1}A$ is called the motion correction matrix.

The term A can be calculated directly. As shown above, constructing the A(v) matrix under non-zero speed is a key to removing motion effect. Correct inversion can be achieved either by using A(v) (motion dependent) in inversion or by using the stationary A corrected as in equation (8).

As discussed above, the column vector in A(v), Vector $A_i^k$ (equation 6-1e), is the combined echo trains with all recovery times $TW_1$, $TW_2$, . . . and $TW_m$, but the same $T_1$ time constant and $T_2$ time constant for each recovery time. If $B_0$ is known, the A(v) matrix can be calculated either analytically or through simulation. Because A(v) is a function of speed and $T_1/T_2$ values, the combination of a different speed and different $T_1/T_2$ value is big, the amount of computation is huge. One way to reduce computation is to decrease the number of different speeds but interpolate/extrapolate to correct speed. Another technique is to adjust the number of $T_1/T_2$ components (bins).

To calculate A(v) correctly is not a simple matter. A simplification can be made where a simple cylinder shape is considered for the volume. In this case analytical equations can be created for the $T_2$ echo losses in A(v) such as:

$$A(v) = (1 - ROP*n*TE)*s(t)$$

With the complex shapes of the magnetic field, the correct A(v) does not have a simple analytical form. One way of creating A(v) more accurately includes procedures to simulate the echo train completely mathematically using the knowledge of $B_0$ and $B_1$. Because this calculation is time consuming, one set of A(v) can be been made using the theoretically perfect $B_0$ and $B_1$, instead of by measuring the field from each real logging tool with a Gauss meter and creating A(v) for each tool.

The magnetic and rf fields can be meshed into small voxels, where each voxel has a B0, $B_1$, and an amount of micro magnetization. A finer mesh provides more accurate echo trains, however, becomes more and more computationally challenging. The tool's response, emf, from any voxel, as in the gridded space of FIG. 8 (discussed below), can be calculated using the principle of reciprocity, as outlined in Hoult, D., 2000, The principle of reciprocity in signal strength calculations—A mathematical guide: Concepts of Magnetic Resonance, 12, (4), 173-187. Then, the micro magnetizations are followed through time using the Bloch equation or rotation matrices. In this way, different A(v) can be found for different ROPs and $T_1$.

$$A(v, T1, ROP) \propto \iiint \text{micro magnetization}(t, T1, ROP) \, dx \, dy \, dz \quad (9)$$

Figure 8:
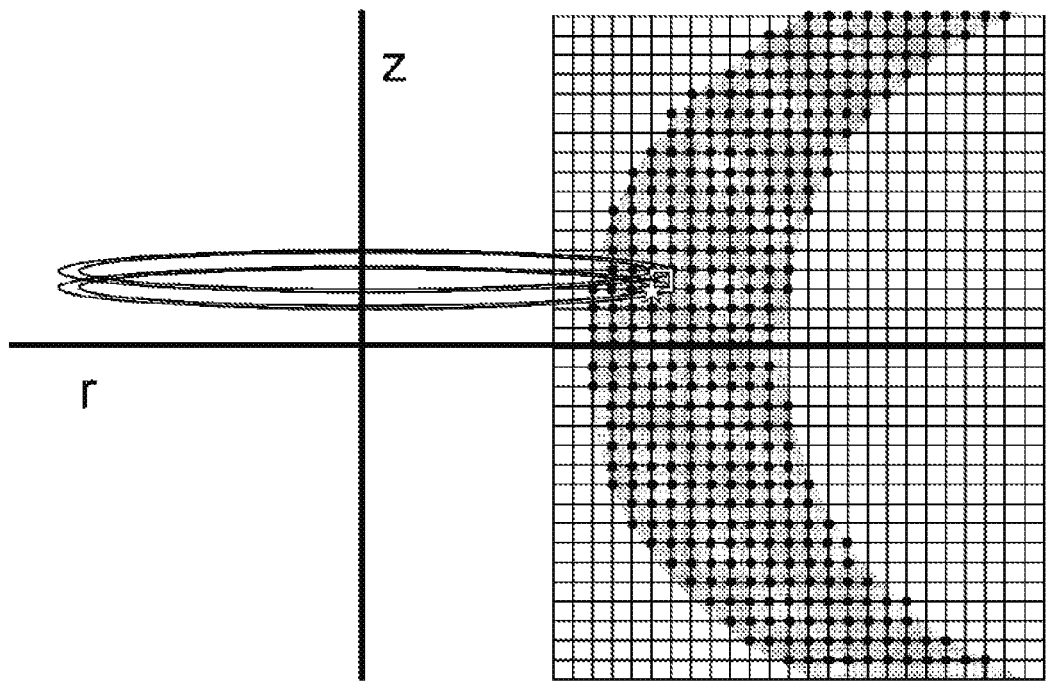
FIG. 8 is a pictorial of a selected sensitive region in a magnetic field.
Figure 9:
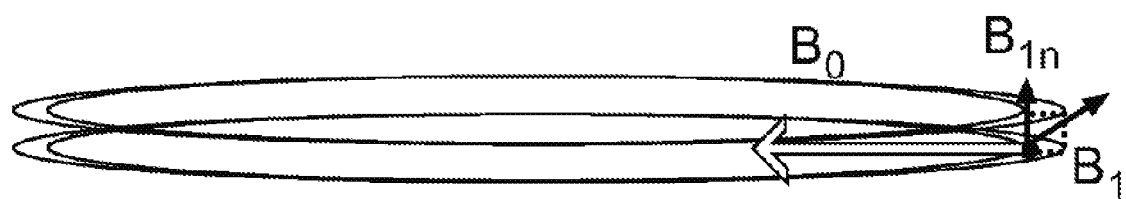
FIG. 9 is a representation of a rotationally symmetric voxel.

FIG. 8 is a pictorial of a selected sensitive region in a magnetic field. This field is split into many voxels. At each voxel a micro magnetization, uses the time dependent $B_1$ and the $B_0$ to calculate a signal for a specific time. That micro magnetization is rotated using excitation and refocusing pulses at specific times to obtain a theoretical echo train. FIG. 9 is a representation of a rotationally symmetric voxel. This allows a simplification in the calculation to go from 3D to 2D using the annulus volume.

Creating the A(v) can be performed using the following steps. First, a zero ROP emf, where the emf is a stimulated signal picked up in the coil which created the $B_1$, is found just as a calibration would be performed on the tool. This allows to rescale the A(v) into the units of porosity instead of in voltage units.

For non-zero ROP calculations, it is simplest to use the tool as a reference frame, that is, as if the tool were stationary and the formation continually moving, however the opposite can also be done. In this case, the magnetization field is moved in relation to the $B_0$ and $B_1$ fields at the ROP. The magnetization, M(t), is a function of speed v, $T_2$ decay, $T_1$ recovery time, $B_0$, and $B_1$. A steady state micro magnetization vector is created for each volume with the micro magnetization aligned with Bo. The direction of $B_0$ in each voxel can be designated as: $\hat{z}=[0\ 0\ 1]$. For a motion along the tool, the calculation is in the adiabatic case, and the Barry phase is not an issue. However, if calculating for other motions such as the vibrational plane the Barry phase should be accounted for or smaller voxels and time increments used.

The sensitive volume is then selected from the $B_0$ field using the tool operating frequency and pulse duration or Fourier transformation of a realistic pulse. The saturation/inversion pulse is used to null/invert the magnetization in that sensitive volume. Typically, a saturation/inversion pulse can have a bandwidth between ±3 to ±10% of the tool's operating frequency. It generally will be larger than the excitation pulse's bandwidth. If only a $T_2$ sequence in motion is to be calculated there would be no saturation/inversion pulse.

The micro magnetization is then allowed to recover for a total time equaling the wait time. Recovery occurs in small time increments, $\Delta t$, using the following equation:

$$M_{t_{i+1}} = (M_{t_i} + (\chi B_0 - M_{t_i}))(1 - e^{-\Delta t/T_1})\hat{z} \quad (10)$$

where M is the micro magnetization to be integrated over, and $\hat{z}$ is the unit vector in the direction of local z, and $\chi$ is the magnetic susceptibility.

The excitation can be performed with or without considering the pulse width. Without considering the pulse shape and timing, the pulse is computed as an instantaneous event. More complex considerations of the pulse can be done, however, for simplicity only this one is discussed. The excitation pulse can be done with any phase. The refocusing pulse then is best when it is shifted 90° out of phase from the excitation pulse. For example, the excitation pulse could be along the "x" axis, while the refocusing pulse is along the "y" axis. The micro magnetization vector is then rotated using the rotation matrix. For the case of an "x" pulse $$R_x(\theta) = \begin{bmatrix} 1 & 0 & 0 \\ 0 & \cos\theta_{tipE} & -\sin\theta_{tipE} \\ 0 & \sin\theta_{tipE} & \cos\theta_{tipE} \end{bmatrix} \quad (11)$$

The tipping angle, $\theta_{tipE}$, for each voxel is determined using the strength of $B_1$ perpendicular to $B_0$, $B_{1n}$, at the voxel's location:

$$\theta_{tipE} = \pi \gamma B_{1n} \tau_{excitation} \quad (12)$$

Where $\gamma$ is the gyromagnetic ratio and $\tau_{excitation}$ is the duration of the excitation pulse.

Following the excitation pulse, the micro magnetization is allowed to process freely around the static field for ½ TE, where TE is the echo time. From the Bloch equation, it is known that magnetization undergoes a precession under the influence of a magnetic field, which can be simply represented as a rotation:

$$R_z(\theta) = \begin{bmatrix} \cos\theta_{FID} & -\sin\theta_{FID} & 0 \\ \sin\theta_{FID} & \cos\theta_{FID} & 0 \\ 0 & 0 & 1 \end{bmatrix} \quad (13)$$

During this time, the magnetization is still recovering by means of equation (12). So, the rotation also performed in small time increments, $$\theta_{FID} = 2\pi\gamma B_0 \Delta t$$

until a total time of ½ TE has passed.

During the free induction decay (FID), it is easy to assess that magnetization spreads within a couple hundred microseconds to the point where no signal would be measured, making the reason for a recovery pulse obvious.

The first step to recovering the magnetization is to perform a pulse, which will flip the fast and slow spins' phases. Ideally, this would be a 180° pulse; but, as with the excitation pulse, the exact rotation each voxel undergoes will be dependent on the $B_{1n}$.

$$R_y(\theta) = \begin{bmatrix} \cos\theta_{tipR} & 0 & \sin\theta_{tipR} \\ 0 & 1 & 0 \\ -\sin\theta_{tipR} & 0 & \cos\theta_{tipR} \end{bmatrix} \quad (14)$$

where:

$$\theta_{tipR} = \pi\gamma B_{1n} \tau_{recovery} \quad (14\text{-}1)$$

Where $\tau_{recovery}$ is the duration of the recovery pulse, aka the pulse intended to be a 180° pulse.

This calculation is repeated for all of the wait times in the $T_1$ experiment and for $T_1$ spanning a range of time, for example, between 0.01 s and 10 s, or all the TEs, or all the $T_2$ decays desired to be investigated in the pulse sequence.

The porosity overcall can be corrected using a more accurate A matrix during inversion processing. Porosity over call is one of the motional effects. There are two ways to gain too much polarization in relation to the stationary measurement. The first is that the movement causes the sensitive region to move out of the "nulled" zone during the saturation/null pulse. Thus instead of a partial recovery there is part of the volume that has full recovery. The second mechanism by which the porosity can over call is by magnetization which relaxed to a higher magnetic field into the sensitive region faster than the magnetization can reach a new equilibrium. These two effects stack onto each other in most cases since the slowest drilling speed is around 40 ft/hr. The A matrix, A(v), can be constructed for a number of different speeds with different Tis. Although this technique requires long computational time for developing the A(v), it only requires being performed once. For low-gradient logging tools, the method proves to be very accurate. In tests, data generated had an average overcall of 2 PU (porosity units) attributed to the motion effects on a short aperture. Applications of one or more techniques taught herein may also provide real-time application as data is logged at a well site.

As mentioned above, the correct inversion can be achieved either by using the correct A(v) in inversion or by using the stationary A corrected as in equation (8). Often, however, the ROP for the NMR tool is not known because of, for example, limitations on data transmissions from the NMR tool to the surface, which means that the correct A(v) for inversion may not be known. It would be helpful to determine the true ROP of the NMR tool so that the correct A(v) can be used in the processing of data from the NMR tool.

A technique for determining the true ROP of the NMR tool proceeds by computing a set of A(v) matrices for different ROPs of the NMR tool, $A(v_q)$ for q=1 to r, where r is the number of A(v) matrices in the set and $v_q$ is the NMR tool ROP associated with the corresponding $A(v_q)$. Data, $Y_{measured}$, is then collected from the NMR tool.

An inversion of the form of equation (7-1) is then performed for each of the members of the set of A(v) matrices:

$$X_{v_q} = A(v_q)^{-1} Y_{measured}, \text{ for } q=1 \text{ to } r \qquad (15)$$

A set of test results, $Y_{test}(v_q)$ for q=1 to r, is then computed for each of the members of the set of A(v) matrices by summing over all $T_1$s:

$$Y_{test}(v_q) = \sum_i^{all} X_{v_q} A(v_q)_{ij}, \text{ for } q = 1 \text{ to } r \qquad (16)$$

an error, $Error_q$, is then computed for each test result:

$$Error_q = F(Y_{measured}, Y_{test}(v_q)) \qquad (17)$$

where F is an error function, such as a least-mean-squares error function or the like.

The true ROP, $ROP_{true}$, of the NMR tool is the $v_q$ that has the minimum $Error_q$. $ROP_{true}$ can be used to calculate the true spectrum $X_{true}$ as shown below:

$$X_{true} = A(ROP_{true})^{-1} Y_{measured} \qquad (18)$$

$X_{true}$. $X_{true}$ can be interpreted to give: porosity, free fluid porosity, macro porosity, micro porosity, differentiate oil gas water, diffusivity, permeably of formation.

Operations are described with reference to the systems/apparatus shown in the block diagrams. However, it should be understood that operations could be performed by embodiments of systems and apparatus other than those discussed with reference to the block diagrams, and embodiments discussed with reference to the systems/apparatus could perform operations different than those discussed.

Further examples consistent with the present teachings are set out in the following numbered clauses.

Clause 1. A method comprising:
acquiring echo signals from operation of a nuclear magnetic resonance logging (NMR) tool in a borehole;
processing the acquired echo signals with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP;
processing each spectrum with respect to the respective matrices in the plurality of matrices to produce a test echo signal for each ROP;
processing the acquired echo signals and the test echo signal for each ROP to produce an error for each ROP;
identifying the ROP for the minimum of the errors as the ROP of the NMR tool; and
processing the acquired echo signals with the matrix corresponding to the identified ROP of the NMR tool to produce true spectrum coefficients.

Clause 2. The method of clause 1 wherein processing the acquired echo signals with respect to an inversion of each matrix in a plurality of matrices comprises:
calculating $X_v = A^{-1}(v) Y_{measured}$,
wherein:
$X_v$ is spectrum coefficients for ROP=v, wherein v is one of the respective rates of penetration of the NMR tool in the borehole,
$A^{-1}(v)$ is the inversion of the matrix that accounts for motion of the NMR tool at ROP=v, and
$Y_{measured}$ are the acquired echo signals.

Clause 3. The method of any preceding clause wherein processing the acquired echo signals with respect to an inversion of each matrix in a plurality of matrices comprises using a LaPlace inversion.

Clause 4. The method of any preceding clause wherein processing each spectrum with respect to the respective matrices in the plurality of matrices comprises:
calculating $Y_{test}(v) = A(v) X_v$,
wherein:
$Y_{test}(v)$ is the test echo signal for ROP=v, wherein v is one of the respective rates of penetration of the NMR tool in the borehole,
A(v) is the matrix that accounts for motion of the NMR tool at ROP=v, and
$X_v$ is spectrum coefficients for ROP=v.

Clause 5. The method of any preceding clause wherein processing the acquired echo signals and the test echo signal for each ROP to produce an error for each ROP comprises:
calculating $F_{error}(Y_{measured}, Y_{test}(v))$,
wherein:
$F_{error}$ is an error function,
$Y_{measured}$ are the acquired echo signals, and
$Y_{test}(v)$ is the test echo signal for ROP=v, wherein v is one of the respective rates of penetration of the NMR tool in the borehole.

Clause 6. The method of any preceding clause wherein identifying the ROP for the minimum of the errors as the ROP of the NMR tool comprises:
calculating $ROP_{true}$=the minimum of $F_{error}(Y_{measured}, Y_{test}(v))$ for all v having a respective matrix in the plurality of matrices.

Clause 7. The method of any preceding clause wherein each of the respective rates of penetration is different from the others of the respective rates of penetration.

Clause 8. A computer program, stored in a non-transitory computer-readable tangible medium, on which is recorded a computer program, the computer program comprising executable instructions, that, when executed, perform a method comprising:
acquiring echo signals from operation of a nuclear magnetic resonance logging (NMR) tool in a borehole;
processing the acquired echo signals with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP;
processing each spectrum with respect to the respective matrices in the plurality of matrices to produce a test echo signal for each ROP;
processing the acquired echo signals and the test echo signal for each ROP to produce an error for each ROP;

identifying the ROP for the minimum of the errors as the ROP of the NMR tool; and processing the acquired echo signals with the matrix corresponding to the identified ROP of the NMR tool to produce true spectrum coefficients.

Clause 9. The computer program of clause 8 wherein processing the acquired echo signals with respect to an inversion of each matrix in a plurality of matrices comprises:

calculating $X_v = A^{-1}(v) Y_{measured}$, wherein:

$X_v$ is spectrum coefficients for ROP=v, wherein v is one of the respective rates of penetration of the NMR tool in the borehole, $A^{-1}(v)$ is the inversion of the matrix that accounts for motion of the NMR tool at ROP=v, and $Y_{measured}$ are the acquired echo signals.

Clause 10. The computer program of clauses 8 or 9 wherein processing the acquired echo signals with respect to an inversion of each matrix in a plurality of matrices comprises using a LaPlace inversion.

Clause 11. The computer program of any of clauses 8-10 wherein processing each spectrum with respect to the respective matrices in the plurality of matrices comprises:

calculating $Y_{test}(v) = A(v) X_v$, wherein:

$Y_{test}(v)$ is the test echo signal for ROP=v, wherein v is one of the respective rates of penetration of the NMR tool in the borehole, $A(v)$ is the matrix that accounts for motion of the NMR tool at ROP=v, and $X_v$ is spectrum coefficients for ROP=v.

Clause 12. The computer program of any of clauses 8-11 wherein processing the acquired echo signals and the test echo signal for each ROP to produce an error for each ROP comprises:

calculating $F_{error}(Y_{measured}, Y_{test}(v))$, wherein:

$F_{error}$ is an error function, $Y_{measured}$ are the acquired echo signals, and $Y_{test}(v)$ is the test echo signal for ROP=v, wherein v is one of the respective rates of penetration of the NMR tool in the borehole.

Clause 13. The computer program of any of clauses 8-12 wherein identifying the ROP for the minimum of the errors as the ROP of the NMR tool comprises:

calculating $ROP_{true}$=the minimum of $F_{error}(Y_{measured}, Y_{test}(v))$ for all v having a respective matrix in the plurality of matrices.

Clause 14. A system comprising:

a nuclear magnetic resonance (NMR) tool;

a control unit coupled to the NMR tool to control the NMR tool; and a processing unit coupled to the NMR tool and the control unit to perform operations to:

acquiring echo signals from operation of the NMR tool in a borehole;

processing the acquired echo signals with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP;

processing each spectrum with respect to the respective matrices in the plurality of matrices to produce a test echo signal for each ROP;

processing the acquired echo signals and the test echo signal for each ROP to produce an error for each ROP;

identifying the ROP for the minimum of the errors as the ROP of the NMR tool; and processing the acquired echo signals with the matrix corresponding to the identified ROP of the NMR tool to produce true spectrum coefficients.

Clause 15. The system of clause 14 wherein processing the acquired echo signals with respect to an inversion of each matrix in a plurality of matrices comprises:

calculating $X_v = A^{-1}(v) Y_{measured}$, wherein:

$X_v$ is spectrum coefficients for ROP=v, wherein v is one of the respective rates of penetration of the NMR tool in the borehole, $A^{-1}(v)$ is the inversion of the matrix that accounts for motion of the NMR tool at ROP=v, and $Y_{measured}$ are the acquired echo signals.

Clause 16. The system of clauses 14 or 15 wherein processing the acquired echo signals with respect to an inversion of each matrix in a plurality of matrices comprises using a LaPlace inversion.

Clause 17. The system of any of clauses 14-16 wherein processing each spectrum with respect to the respective matrices in the plurality of matrices comprises:

calculating $Y_{test}(v) = A(v) X_v$, wherein:

$Y_{test}(v)$ is the test echo signal for ROP=v, wherein v is one of the respective rates of penetration of the NMR tool in the borehole, $A(v)$ is the matrix that accounts for motion of the NMR tool at ROP=v, and $X_v$ is spectrum coefficients for ROP=v.

Clause 18. The system of any of clauses 14-17 wherein processing the acquired echo signals and the test echo signal for each ROP to produce an error for each ROP comprises:

calculating $F_{error}(Y_{measured}, Y_{test}(v))$, wherein:

$F_{error}$ is an error function, $Y_{measured}$ are the acquired echo signals, and $Y_{test}(v)$ is the test echo signal for ROP=v, wherein v is one of the respective rates of penetration of the NMR tool in the borehole.

Clause 19. The system of any of clauses 14-18 wherein identifying the ROP for the minimum of the errors as the ROP of the NMR tool comprises:

calculating $ROP_{true}$=the minimum of $F_{error}(Y_{measured}, Y_{test}(v))$ for all v having a respective matrix in the plurality of matrices.

Clause 20. The system of any of clauses 14-19 wherein each of the respective rates of penetration is different from the others of the respective rates of penetration.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:

acquiring echo signals from operation of a nuclear magnetic resonance logging (NMR) tool in a borehole;

processing the acquired echo signals with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP;

processing each spectrum with respect to the respective matrices in the plurality of matrices to produce a test echo signal for each ROP;

processing the acquired echo signals and the test echo signal for each ROP to produce an error for each ROP;

identifying an ROP for a minimum of the errors as the ROP of the NMR tool; and processing the acquired echo signals with the matrix corresponding to the identified ROP of the NMR tool to produce true spectrum coefficients.

2. The method of claim 1 wherein processing the acquired echo signals with respect to an inversion of each matrix in a plurality of matrices comprises:

calculating $X_v = A^{-1}(v) Y_{measured}$, wherein:

$X_v$ is spectrum coefficients for ROP=v, wherein v is one of the respective rates of penetration of the NMR tool in the borehole, $A^{-1}(v)$ is the inversion of the matrix that accounts for motion of the NMR tool at ROP=v, and $Y_{measured}$ are the acquired echo signals.

3. The method of claim 1 wherein processing the acquired echo signals with respect to an inversion of each matrix in a plurality of matrices comprises using a LaPlace inversion.

4. The method of claim 1 wherein processing each spectrum with respect to the respective matrices in the plurality of matrices comprises:

calculating $Y_{test}(v) = A(v) X_v$, wherein:

$Y_{test}(v)$ is the test echo signal for ROP=v, wherein v is one of the respective rates of penetration of the NMR tool in the borehole, $A(v)$ is the matrix that accounts for motion of the NMR tool at ROP=v, and $X_v$ is spectrum coefficients for ROP=v.

5. The method of claim 1 wherein processing the acquired echo signals and the test echo signal for each ROP to produce an error for each ROP comprises:

calculating $F_{error}(Y_{measured}, Y_{test}(V))$, wherein:

$F_{error}$ is an error function, $Y_{measured}$ are the acquired echo signals, and $Y_{test}(v)$ is the test echo signal for ROP=v, wherein v is one of the respective rates of penetration of the NMR tool in the borehole.

6. The method of claim 5 wherein identifying the ROP for the minimum of the errors as the ROP of the NMR tool comprises:

calculating $ROP_{true}$=the minimum of $F_{error}(Y_{measured}, Y_{test}(v))$ for all v having a respective matrix in the plurality of matrices.

7. The method of claim 1 wherein each of the respective rates of penetration is different from the others of the respective rates of penetration.

8. A computer program, stored in a non-transitory computer-readable tangible medium, on which is recorded the computer program, the computer program comprising executable instructions, that, when executed, perform a method comprising:

acquiring echo signals from operation of a nuclear magnetic resonance logging (NMR) tool in a borehole;

processing the acquired echo signals with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP;

processing each spectrum with respect to the respective matrices in the plurality of matrices to produce a test echo signal for each ROP;

processing the acquired echo signals and the test echo signal for each ROP to produce an error for each ROP;

identifying an ROP for a minimum of the errors as the ROP of the NMR tool; and processing the acquired echo signals with the matrix corresponding to the identified ROP of the NMR tool to produce true spectrum coefficients.

9. The computer program of claim 8 wherein processing the acquired echo signals with respect to an inversion of each matrix in a plurality of matrices comprises:

calculating $X_v = A^{-1}(v) Y_{measured}$, wherein:

$X_v$ is spectrum coefficients for ROP=v, wherein v is one of the respective rates of penetration of the NMR tool in the borehole, $A^{-1}(v)$ is the inversion of the matrix that accounts for motion of the NMR tool at ROP=v, and $Y_{measured}$ are the acquired echo signals.

10. The computer program of claim 8 wherein processing the acquired echo signals with respect to an inversion of each matrix in a plurality of matrices comprises using a LaPlace inversion.

11. The computer program of claim 8 wherein processing each spectrum with respect to the respective matrices in the plurality of matrices comprises:

calculating $Y_{test}(v) = A(v) X_v$, wherein:

$Y_{test}(v)$ is the test echo signal for ROP=v, wherein v is one of the respective rates of penetration of the NMR tool in the borehole, $A(v)$ is the matrix that accounts for motion of the NMR tool at ROP=v, and $X_v$ is spectrum coefficients for ROP=v.

12. The computer program of claim 8 wherein processing the acquired echo signals and the test echo signal for each ROP to produce an error for each ROP comprises:

calculating $F_{error}(Y_{measured}, Y_{test}(v))$, wherein:

$F_{error}$ is an error function, $Y_{measured}$ are the acquired echo signals, and $Y_{test}(v)$ is the test echo signal for ROP=v, wherein v is one of the respective rates of penetration of the NMR tool in the borehole.

13. The computer program of claim 8 wherein identifying the ROP for the minimum of the errors as the ROP of the NMR tool comprises:

calculating $ROP_{true}$=the minimum of $F_{error}(Y_{measured}, Y_{test}(v))$ for all v having a respective matrix in the plurality of matrices.

14. A system comprising:
a nuclear magnetic resonance (NMR) tool;
a control unit coupled to the NMR tool to control the NMR tool; and
a processing unit coupled to the NMR tool and the control unit to perform operations to:
  acquiring echo signals from operation of the NMR tool in a borehole;
  processing the acquired echo signals with respect to an inversion of each matrix in a plurality of matrices, wherein each matrix in the plurality of matrices accounts for motion of the NMR tool at a respective rate of penetration (ROP) of the NMR tool in the borehole, to produce respective spectrum coefficients for each ROP;
  processing each spectrum with respect to the respective matrices in the plurality of matrices to produce a test echo signal for each ROP;
  processing the acquired echo signals and the test echo signal for each ROP to produce an error for each ROP;
  identifying an ROP for a minimum of the errors as the ROP of the NMR tool; and
  processing the acquired echo signals with the matrix corresponding to the identified ROP of the NMR tool to produce true spectrum coefficients.

15. The system of claim 14 wherein processing the acquired echo signals with respect to an inversion of each matrix in a plurality of matrices comprises:
  calculating $X_v = (v) Y_{measured}$,
  wherein:
  $X_v$ is spectrum coefficients for ROP=v, wherein v is one of the respective rates of penetration of the NMR tool in the borehole,
  $A^{-1}(v)$ is the inversion of the matrix that accounts for motion of the NMR tool at ROP=v, and
  $Y_{measured}$ are the acquired echo signals.

16. The system of claim 14 wherein processing the acquired echo signals with respect to an inversion of each matrix in a plurality of matrices comprises using a LaPlace inversion.

17. The system of claim 14 wherein processing each spectrum with respect to the respective matrices in the plurality of matrices comprises:
  calculating $Y_{test}(v) = A(v) X_v$,
  wherein:
  $Y_{test}(v)$ is the test echo signal for ROP=v, wherein v is one of the respective rates of penetration of the NMR tool in the borehole,
  $A(v)$ is the matrix that accounts for motion of the NMR tool at ROP=v, and
  $X_v$ is spectrum coefficients for ROP=v.

18. The system of claim 14 wherein processing the acquired echo signals and the test echo signal for each ROP to produce an error for each ROP comprises:
  calculating $F_{error}(Y_{measured}, Y_{test}(v))$,
  wherein:
  $F_{error}$ is an error function,
  $Y_{measured}$ are the acquired echo signals, and
  $Y_{test}(v)$ is the test echo signal for ROP=v, wherein v is one of the respective rates of penetration of the NMR tool in the borehole.

19. The system of claim 18 wherein identifying the ROP for the minimum of the errors as the ROP of the NMR tool comprises:
  calculating $ROP_{true}$=the minimum of $F_{error}(Y_{measured}, Y_{test}(v))$ for all v having a respective matrix in the plurality of matrices.

20. The system of claim 14 wherein each of the respective rates of penetration is different from the others of the respective rates of penetration.

* * * * *